United States Patent
Grocutt et al.

(10) Patent No.: US 10,169,573 B2
(45) Date of Patent: Jan. 1, 2019

(54) MAINTAINING SECURE DATA ISOLATED FROM NON-SECURE ACCESS WHEN SWITCHING BETWEEN DOMAINS

(71) Applicant: ARM Limited, Cambridge (GB)

(72) Inventors: Thomas Christopher Grocutt, Impington (GB); Richard Roy Grisenthwaite, Guilden Morden (GB)

(73) Assignee: ARM Limited, Cambridge (GB)

( * ) Notice: Subject to any disclaimer, the term of this patent is extended or adjusted under 35 U.S.C. 154(b) by 80 days.

(21) Appl. No.: 15/284,830

(22) Filed: Oct. 4, 2016

(65) Prior Publication Data
US 2017/0024557 A1    Jan. 26, 2017

Related U.S. Application Data

(63) Continuation of application No. 13/368,419, filed on Feb. 8, 2012, now Pat. No. 9,477,834.

(51) Int. Cl.
G06F 21/62    (2013.01)
G06F 21/52    (2013.01)
(Continued)

(52) U.S. Cl.
CPC .......... *G06F 21/52* (2013.01); *G06F 9/30134* (2013.01); *G06F 9/462* (2013.01); *G06F 21/6245* (2013.01); *G06F 2221/2105* (2013.01)

(58) Field of Classification Search
CPC ............. G06F 21/52; G06F 2221/2105; G06F 9/30134; G06F 21/6245; G06F 21/2179
See application file for complete search history.

(56) References Cited

U.S. PATENT DOCUMENTS 4,177,514 A    12/1979 Rupp
4,488,227 A    12/1984 Miu et al.
(Continued)

FOREIGN PATENT DOCUMENTS

CN    1711524    12/2005
CN    1711525    12/2005
(Continued)

OTHER PUBLICATIONS

ARM Ltd., Cortex-M4 Devices—Generic User Guide, Dec. 16, 2010, ARM DUI 0553A, Issue A, First release. Downloaded from http://infocenter.arm.com/help/topic/com.arm.doc.dui0553a/DUI0553A_cortex_m4_dgug.pdf on Feb. 11, 2018 (Year: 2010).*
(Continued)

*Primary Examiner* — Carl G Colin
*Assistant Examiner* — Gary E Lavelle
(74) *Attorney, Agent, or Firm* — Nixon & Vanderhye P.C.

(57) ABSTRACT

A data processing apparatus including circuitry for performing data processing, a plurality of registers; and a data store including regions having different secure levels, at least one secure region (for storing sensitive data accessible by the data processing circuitry operating in the secure domain and not accessible by the data processing circuitry operating in a less secure domain) and a less secure region (for storing less secure data). The circuitry is configured to determine which stack to store data to, or load data from, in response to the storage location of the program code being executed. In response to program code calling a function to be executed, the function code being stored in a second region, the second region having a different secure level to the first region, the data processing circuitry is configured to determine which of the first and second region have a lower secure level.

11 Claims, 13 Drawing Sheets

(51) Int. Cl.
　　　*G06F 9/30*　　　(2018.01)
　　　*G06F 9/46*　　　(2006.01)

(56) References Cited

U.S. PATENT DOCUMENTS

| | | | |
|---|---|---|---|
| 4,519,032 | A | 5/1985 | Mendell |
| 5,590,332 | A | 12/1996 | Baker |
| 5,812,850 | A | 9/1998 | Wimble |
| 6,363,474 | B1 | 3/2002 | McCulley et al. |
| 6,993,663 | B1 | 1/2006 | Paya et al. |
| 7,120,794 | B2 * | 10/2006 | Kelley .................. G06F 9/468 713/164 |
| 7,966,466 | B2 | 6/2011 | Kershaw et al. |
| 7,984,257 | B2 * | 7/2011 | Funk ................. G06F 12/1491 711/163 |
| 8,051,467 | B2 | 11/2011 | Renno |
| 9,116,711 | B2 | 8/2015 | Grocutt |
| 9,202,071 | B2 | 12/2015 | Grocutt et al. |
| 9,213,828 | B2 | 12/2015 | Grocutt et al. |
| 9,477,834 | B2 | 10/2016 | Grocutt et al. |
| 2002/0099933 | A1 * | 7/2002 | Nevill ................... G06F 9/462 712/228 |
| 2004/0003377 | A1 | 1/2004 | Di Loreto |
| 2004/0139346 | A1 | 7/2004 | Watt et al. |
| 2004/0168047 | A1 | 8/2004 | Fukai et al. |
| 2004/0239346 | A1 | 12/2004 | Iyer |
| 2005/0044292 | A1 | 2/2005 | McKeen |
| 2005/0177666 | A1 | 8/2005 | Kimelman et al. |
| 2006/0224866 | A1 | 10/2006 | Grisenthwaite et al. |
| 2006/0259487 | A1 | 11/2006 | Havens et al. |
| 2006/0259764 | A1 | 11/2006 | Asal |
| 2007/0204259 | A1 * | 8/2007 | Wilner ................ G06F 9/44521 717/124 |
| 2008/0216175 | A1 | 9/2008 | Pike |
| 2008/0250216 | A1 | 10/2008 | Kershaw et al. |
| 2008/0250217 | A1 | 10/2008 | Kershaw et al. |
| 2010/0031360 | A1 | 2/2010 | Seshadri et al. |
| 2010/0057960 | A1 | 3/2010 | Renno |
| 2010/0082927 | A1 * | 4/2010 | Riou .................. G06F 12/1433 711/163 |
| 2010/0325397 | A1 | 12/2010 | Craske et al. |
| 2011/0225402 | A1 * | 9/2011 | Grisenthwaite ..... G06F 9/30101 712/244 |
| 2012/0036299 | A1 | 2/2012 | Renno |
| 2012/0036341 | A1 * | 2/2012 | Morfey .............. G06F 12/1491 712/229 |
| 2012/0042154 | A1 | 2/2012 | Grisenthwaite |

FOREIGN PATENT DOCUMENTS

| | | | |
|---|---|---|---|
| CN | 100524224 | | 8/2009 |
| CN | 101661440 | | 3/2010 |
| EP | 0 859 319 | | 8/1998 |
| EP | 1 331 539 | | 7/2003 |
| GB | 2448149 | | 10/2008 |
| GB | 2478733 | A * | 9/2011 ......... G06F 9/30101 |
| GB | 2482701 | | 2/2012 |
| JP | 09091154 | | 4/1997 |
| JP | 09091154 | A * | 4/1997 |
| JP | H10-228421 | | 8/1998 |
| JP | H11-272462 | | 10/1999 |
| JP | 2002-157115 | | 5/2002 |
| JP | 2002-526822 | | 8/2002 |
| JP | 2004-280801 | | 10/2004 |
| JP | 2004-288155 | | 10/2004 |
| JP | 2007-58776 | | 3/2007 |
| JP | 2008-257735 | | 10/2008 |
| JP | 2010-503107 | | 1/2010 |
| JP | 2010-186386 | | 8/2010 |
| JP | 2011-216118 | | 10/2011 |
| WO | 02/42914 | | 5/2002 |
| WO | WO 2007/089373 | | 8/2007 |
| WO | 2008/030093 | | 3/2008 |
| WO | WO 2010/004240 | | 1/2010 |
| WO | 2011/114124 | | 9/2011 |

OTHER PUBLICATIONS

Office Action dated Jun. 29, 2017 in co-pending U.S. Appl. No. 14/795,933, 52 pages.
ARM Limited, ARMv6-M Architecture Reference Manual, Sep. 2010, Issue C, 436 pages.
ARM Limited, Cortex-M3 Technical Reference Manual, Jun. 2007, Rev: r1p1, Issue E, 384 pages.
English translation of Israeli Office Action dated Feb. 14, 2017 in IL 233726, 2 pages.
English translation of Japanese Office Action dated Feb. 13, 2017 in JP 2013-012980, 8 pages.
English translation of Chinese Office Action dated Jan. 3, 2017 in CN 201310038646.4, 13 pages.
English translation of Chinese Second Office Action dated Mar. 9, 2017 in CN 201380008433.5, 6 pages.
U.S. Appl. No. 13/735,350, filed Jan. 17, 2013, Grocutt et al.
U.S. Appl. No. 14/795,933, filed Jul. 10, 2015, Grocutt.
U.S. Appl. No. 14/935,504, filed Nov. 9, 2015, Grocutt et al.
Office Action dated Feb. 13, 2015 in co-pending U.S. Appl. No. 13/735,350, 59 pages.
Office Action dated Aug. 31, 2015 in co-pending U.S. Appl. No. 13/735,350, 59 pages.
Office Action dated Mar. 10, 2016 in co-pending U.S. Appl. No. 13/735,350 58 pages.
Final Office Action dated Sep. 22, 2016 in co-pending U.S. Appl. No. 13/735,350 54 pages.
International Search Report and Written Opinion of the International Searching Authority dated May 7, 2013 in PCT/GB2013/050102, 8 pages.
GB Search Report dated Aug. 14, 2013 in GB 1220769.2, 3 pages.
International Search Report and Written Opinion of the International Searching Authority dated Sep. 20, 2013 in PCT/GB2013/052105, 8 pages.
International Search Report and Written Opinion of the International Searching Authority dated Oct. 7, 2013 in PCT/GB2013/052107, 8 pages.
International Search Report and Written Opinion of the International Searching Authority dated Sep. 27, 2013 in PCT/GB2013/052108, 9 pages.
ARM Limited, "Cortex-M3 Technical Reference Manual" Revision: r1p1, Dec. 15, 2005, 42 pages.
International Preliminary Report on Patentability dated Aug. 21, 2014 in PCT/GB2013/050029, 6 pages.
ARM Limited; Cortex-M3, Revision: r1p1, Technical Reference Manual; 2006, ARM Limited, downloaded from http://infocenter.arm.com/help/topic/com.arm.doc.ddi0337e/DDI0337E_cortex_m3_r1p1_trm.pdf , on Oct. 2, 2014, pp. 1-22, 2-3, 5-2, 5-9, 5-10, 5-11 and 5-22 (384 pages).
ARM Limited, ARM Procedure Call Standard for the ARM Architecture, Oct. 16, 2009, release 2.08, downloaded from https://web.eecs.umich.edu/~prabal/teaching/eecs373-f11/readings/ARM-AAPCS-EABI-v2.08.pdf on Dec. 14, 2014, 34 pages.
ARM Limited, Corex-M3Technical Reference Manual, Jun. 13, 2007, ARM Limited, Revision r1p1, Chapters 5, 10 and 11, downloaded from http://infocenter.arm.com/help/topic/com.arm.doc.ddi0337e/DDI0337E_cortex_m3_r1p1_trm.pdf, 97 pages.
Cocke et al, "Scheme to Improve the Call/Return Performance on the RS/6000" Jul. 1, 1993, IBM, pp. 143-145.
ARM Limited, ARM® v7-M Architecture Reference Manual, Feb. 2010, ARM Limited, C_errata_v3, https://web.eecs.umich.edu/~prabal/teaching/eecs373-f10/readings/ARMv7-M_ARM.pdf on Dec. 16, 2014, 716 pages.
Micromint USA, Eagle interrupts Example, Jun. 20, 2010, micromint.com, downloaded from http://wiki.micromint.com/index.php/Eagle_interrupts_Example on Nov. 12, 2014, pp. 1-2.
International Preliminary Report on Patentability dated Oct. 7, 2014 in PCT/GB2013/052107, 6 pages.
International Preliminary Report on Patentability dated Jan. 29, 2014 in PCT/GB2013/050102, 23 pages.
International Preliminary Report on Patentability dated Apr. 16, 2015 in PCT/GB2013/052105, 5 pages.

(56) References Cited

OTHER PUBLICATIONS

International Preliminary Report on Patentability dated Apr. 16, 2015 in PCT/GB2013/052108, 6 pages.
English translation of Chinese Office Action dated Jun. 28, 2016 in CN 201380008433.5, 10 pages.
English translation of Chinese First Office Action dated Dec. 19, 2016 in CN 201380049898.5, 7 pages.
English translation of Japanese Office Action dated Dec. 16, 2016 in JP 2014-556133, 3 pages.
English translation of Chinese Office Action dated Feb. 13, 2017 in CN 201380050004.4, 5 pages.
Final Office Action dated Jan. 17, 2018 in co-pending U.S. Appl. No. 14/795,933, 29 pages.
Office Action dated Oct. 6, 2017 in co-pending U.S. Appl. No. 14/935,504, 47 pages.
The ARM-THUMB Procedure Call Standard, Oct. 24, 2000, ARM Limited, Issue B-01, downloaded from http://infocenter.arm.com/help/topic/com.arm.doc.espc0002/ATPCS.pdf on Sep. 21, 2013, 37 pages.
Cortex-M3 Technical Reference Manual, ARM Limited, Revision r1 p1, Jun. 13, 2007, downloaded from http://infocenter.arm.com/help/topic/com.arm.doc.ddi0337e/DDI0337E_cortex_m3_r1p1trm.pdf on Sep. 21, 2017, 468 pages.

* cited by examiner

|  | Description | Usage |
|---|---|---|
| LDRS Rt, #offset | Load stack, similar to LDR except that it uses either the secure, or non secure stack pointer as the base address depending on the ASSel flag | Used to accelerate access to function arguments and return values that could be either on the secure or non secure stacks |
| STRS, Rn, #offset | Store stack, similar to STR except that it uses either the secure, or non secure stack pointer as the base address depending on the ASSel flag | |
| NSBT | A special instruction that is a used to indicate a valid entry point into the secure domain from the non secure domain | Allows branches into the secure code base to be restricted to the starts of public API functions |
| MOVCM <c> <registers> | Conditionally clears the values of multiple registers | Accelerates clearing the register state around security domain changes |
| TTS <Rn> | Tests the security state of target address specified in Rn and sets the ASSel flag if address is in a lower security domain | Used to accelerate indirect function calling where the target could be in any security domain. The TTSZ variant is useful if operations need to be conditionally performed based on the security state of the target |
| TTSZ <Rn> | Similar to TTS but sets the Z flag as well as ASSel if Rn is a lower security domain | |

FIG. 3B

| Original state | exception state | | Stack opperations to be performed when a second exception occuring during:- | |
|---|---|---|---|---|
| | first | second | exception entry | exception return |
| secure | secure | secure | Push subset | None |
| | | insecure | Push all | Push remaining and clear all |
| | insecure | secure | Push subset | None |
| | | insecure | Push all | None |
| insecure | secure | secure | Push subset | None |
| | | insecure | Push subset | Clear subset |
| | insecure | secure | Push subset | None |
| | | insecure | Push subset | None |

Key:-
Subset      Tha caller saved subset of the register state
All          The entire register state apart from the stack pointer
Remaing    The callee saved subset of the register state IE All -

FIG. 8A

| | SP Offset | |
|---|---|---|
| | 0x20 | Original SP, 8 byte aligned |
| xPSR | 0x1C | |
| ReturnAddress | 0x18 | |
| LR (R14) | 0x14 | |
| R12 | 0x10 | |
| R3 | 0x0C | |
| R2 | 0x08 | |
| R1 | 0x04 | |
| R0 | 0x00 | New SP, 8 byte aligned |

Partial stack frame used when remaining within the same security state, or transitioning to the secure state.

| | SP Offset | |
|---|---|---|
| | 0x40 | Original SP, 8 byte aligned |
| xPSR | 0x3C | |
| ReturnAddress | 0x38 | |
| LR (R14) | 0x34 | |
| R12 | 0x30 | |
| R3 | 0x2C | |
| R2 | 0x28 | |
| R1 | 0x24 | |
| R0 | 0x20 | |
| R11 | 0x1C | |
| R10 | 0x18 | |
| R9 | 0x14 | |
| R8 | 0x10 | |
| R7 | 0x0C | |
| R6 | 0x08 | |
| R5 | 0x04 | |
| R4 | 0x00 | New SP, 8 byte aligned |

Full stack frame used when transitioning to the insecure state.

FIG. 8B

MAINTAINING SECURE DATA ISOLATED FROM NON-SECURE ACCESS WHEN SWITCHING BETWEEN DOMAINS

CROSS-REFERENCE

This application is a continuation of U.S. application Ser. No. 13/368,419 filed Feb. 8, 2012, the entire contents of which are incorporated herein by reference in this application.

TECHNICAL FIELD

The technical field relates to the field of data processing and in particular to the processing of sensitive data and code.

BACKGROUND

Many data processing systems and architectures provide ways of isolating and protecting sensitive data and sections of code from access by unauthorised persons or processes. Although it is important to be able to provide security there is an overhead in performance and circuit area associated with this protection.

In small systems such as microcontrollers, it is very important that these overheads are kept low and thus, some compromise between level of security and performance may need to be made.

One way of keeping data and code secure is provided by ARM® of Cambridge UK, with their Trustzone architecture where there are secure and non-secure states and an exception instruction is used to transition between the states, the exception handler protecting the security of the secure side. Although this approach provides a high degree of security, considerable software intervention in the form of the software exception handler is required to change security states which both reduces the performance of the system and increases the amount of effort required to develop an external application program interface API for the secure software as all calls must be proxied through the exception hander.

U.S. Pat. No. 7,966,466 and US2008/0250216 discloses an alternative secure system where a data store has a secure side and a non-secure side and the location within this data store of the code currently being executed determines the domain the processor is operating in and thus, the data that it is allowed to access.

SUMMARY

A first aspect of the present invention provides a data processing apparatus, said data processing apparatus comprising: data processing circuitry for performing data processing operations in response to program code; a plurality of registers; and a data store for storing data, said data store comprising a plurality of regions, each region having a secure level, and comprising at least one secure region for storing sensitive data accessible by said data processing circuitry operating in said secure domain and not accessible by said data processing circuitry operating in a less secure domain and a less secure region for storing less secure data; said data store comprising at least two stacks a secure stack in said secure region and a less secure stack in said less secure region; said data processing circuitry operating in said secure domain when processing program code stored in said secure region and operating in said less secure domain when processing program code stored in said less secure region; wherein said data processing circuitry is configured to determine which stack to store data to, or load data from, in response to said storage location of said program code being executed; and in response to program code stored in a first region calling a function to be executed, said function code being stored in a second region, said second region having a different secure level to said first region, said data processing circuitry is configured to determine which of said first and second region have a lower secure level and when executing said program code and said function code, to access said stack of said region with said lower secure level for function arguments and return data values.

The present invention recognises that it is important that access to secure data and secure code is limited but that it is also at times important that this security is provided in a low latency, area efficient manner.

The use of different stacks in different secure regions of a memory is a known way of storing data during processing. When switching between tasks and domains these stacks are often used to store the current state of the processor so that it can be restored later. Isolating data and code that is processed in one domain from data and code being processed in another becomes more complex when a program in one domain calls a function in another domain and requires function arguments and return values to pass between the two of them. When switching between secure and non-secure domains any transfer of data between domains needs to be carefully controlled to avoid sensitive data becoming available to non-secure programs. The present invention makes use of the stacks in the different secure regions and also of the ability to determine the current security level from the storage location of the code currently being executed, so that when detecting a function call that causes a switch in secure regions, it controls which stack is accessed for the arguments and return values of the function, so that they can be accessed from the domain that called the function and the domain the function is executing in while other data is maintained within its own region.

In this way, with little additional hardware and with no dedicated software handling routine different security domains can be switched between and data transferred between them in an efficient manner.

It should be noted that although the stack of the less secure level can be used to store function arguments and return data values, not all function arguments and return data values may be stored on the stack in some embodiments certain registers may be available for storing values that are accessible to both a program calling a function and the function being called and in such a case these may be used for storing function arguments and return data values and it is only where more values need to be passed between the program code and the function that the stack of the less secure level is used.

It should be noted that the step of calling a function relates to one section of code within a program branching to another section of code where data values need to be passed between the two sections of code. Although this is described as a program calling a function, it should be understood that there may be no significant difference between the two sections of code, the caller is considered to be the program and the callee the function. Thus, the caller may be a large program calling a smaller function to perform a particular task, or it may be a program branching to another similar sized program, or it may be a function calling a further function or application.

In some embodiments, said data processing apparatus further comprises a storage location for storing a stack select flag; and flag setting circuitry; wherein said data store comprises two regions a more secure region and a less secure region; said flag setting circuitry being configured to set said stack select flag in response to less secure program code calling a more secure function and to clear said stack select flag in response to secure program code calling any function and in response to less secure program code calling a less secure function.

One way of indicating to the processing circuitry which stack should be used is the use of a stack select flag which is set automatically when the program code switches between secure domains. This is a straightforward way of allowing the circuitry to determine at a particular moment which stack is to be used that is controlled by hardware and is therefore both secure and low latency. If there are two domains a simple one bit flag can be used that the hardware can set or clear when a function is called in dependence upon any changes to secure region. In this regard, setting of the flag may mean setting it to a one, or it may means setting it to a zero, with the clearing of the flag being the setting of it to the other value. It should also be noted that the hardware circuitry that sets the flag may be part of the processing circuitry or it may be distributed somewhere in the data processing apparatus or it may be part of some data access control circuitry.

In some embodiments, said data processing apparatus further comprises a storage location for storing a stack select flag; flag setting circuitry; said flag setting circuitry being configured to set said stack select flag to indicate a lower secure region in response to detecting said data processing circuitry transitioning between regions having different secure levels and to indicate a current secure region in response to detecting said data processing circuitry executing a function call to a same secure level.

In some embodiments, the stack select flag may indicate the lower of two secure regions that the processing circuitry is transitioning between. Where there are more than two different secure levels, then the simple setting and clearing of a flag will not be sufficient to discriminate between the levels and a multiple bit value may be needed for the flag, with the hardware indicating the less secure region when regions are transitioned between.

In some embodiments, said data processing circuitry is configured in response to a set stack select flag instruction in said program code to set said stack select flag to a value indicating a less secure region, wherein said program code calling a less secure function comprises said set stack select flag instruction in said program code prior to calling said function.

Although circuitry will be responsive to the transition between domains to set the stack select flag automatically it can also be set by software instructions inserted into the code. This may be important in some circumstances where the transition is not sufficient to allow the flag settings to be correct. Thus, for example if the program code is calling a less secure function a transition to the less secure code will clear the flag in the case of there only being two different secure regions or set it to indicate the lower region if there are more than two. However, prior to transitioning the secure program will need to store function arguments to the stack and thus, unless the select stack flag is set to indicate the less secure stack, arguments to be used by the less secure function will be stored on the secure stack that it cannot access.

In some embodiments, said data processing apparatus is responsive to said program code calling a function to determine said stack to access for said function arguments and said return values in dependence upon said stack select flag, such that said stack indicated by said stack select flag is accessed for said function arguments and said return values.

As noted previously, the storage location of the program code being executed is generally a good indication of which stack to use. However, if a function is being called in a different security domain then the stack select flag can be used to determine in this case which stack should be used, as it may be that where data values are to be passed between the two domains then a stack accessible by both the function and the program calling it needs to be used.

In some embodiments said data processing circuitry is configured in response to a register stack load instruction in said program code indicating at least one register is to be loaded with a value from at least one location on a stack, to determine which stack to access in dependence upon said stack select flag and said secure level of a current processing domain In some embodiments, said data processing circuitry is configured in response to a register stack load instruction in said program code indicating at least one register is to be loaded with a value from at least one location on a stack, to determine which stack to access in dependence upon said stack select flag.

It may be convenient to have a special instruction that indicates that the stack select flag should be taken into account when a register is to be loaded with a value from a stack, so that the correct stack is selected. In this way by the use of this new instruction one can maintain the security of the system while allowing data to pass between the domains. It may be that the stack select flag is sufficient to indicate the domain, or it may be that it is the flag and current operating domain that provides the indication of the stack to use.

In some embodiments, said data processing circuitry is configured in response to a register stack store instruction in said program code indicating at least one value stored in at least one register is to be stored in at least one location on a stack to determine whether said stack comprises said secure stack or said less secure stack from said stack select flag.

In some embodiments, said data processing circuitry is configured in response to a register stack store instruction in said program code indicating at least one value stored in at least one register is to be stored in at least one location on a stack to determine whether said stack comprises said secure stack or said less secure stack from said stack select flag and said secure level of a current processing domain Similarly to the stack load instruction there is also a stack store instruction which is used in conjunction with the stack select flag and may be used in conjunction with the current security domain to ensure the correct stack is used when transferring data values between different security domains when functions operable in a different security domain are called from a program.

In some embodiments said data processing circuitry is configured in response to said function code being in said less secure region and said program code being in said secure region to load a return address onto said secure stack and to load said link register with a value indicating said return address from said function is loaded on said secure stack.

Where one is transitioning from a more secure to a less secure region, the return address should not be available to the non-secure side. The use of the link register to indicate that the secure stack should be accessed to retrieve the return address is a simple way to protect the security of the program counter with minimal additional hardware costs or performance implications.

In some embodiments, said data processing circuitry is configured in response to a stack select flag set instruction in said program code, said stack flag set instruction specifying a register that stores a target address of executable code, to determine whether said target address is in said secure region or said less secure region and to set said stack select flag to indicate said less secure region if said target address is in said less secure region.

As noted previously, the stack set flag may be set automatically or it may be set in response to an instruction. In addition to a simple stack flag set instruction there may also be a stack flag set instruction available which indicates the target address of executable code, for example subsequent code to be executed. This can be used where it is not clear whether the function called is to be executed in the same domain as the program that called it is executing in, where the program is executing in a secure domain. During actual execution, use of this instruction allows the target address of the called code to be examined and where it is in a different secure region to the code calling it then the stack select flag can be set to an appropriate value to indicate this. Furthermore, when looking to find any return values after a function has executed, the address of the code that has been executed will provide the required information.

In some embodiments, said data processing circuitry is configured in response to a further flag set instruction in said program code, said further flag set instruction specifying a register for storing a target address of executable code, to determine whether said target address is in said secure region or said less secure region and to set said stack select flag and a further flag if said target address is in said less secure region.

An additional instruction may also be helpful which not only sets the stack select flag but also sets a further flag in response to the same conditions. Where the processor uses instructions that are conditional on certain events then flags can be set to indicate these events. It may be that some instructions should be executed in dependence upon whether the stack select flag is set or not and if this is the case then a convenient way of implementing this could be to use an instruction that sets both the stack select flag and a further flag and then instructions that are conditional on this further flag can be used. One example of the further flag that could be used is the zero flag.

In some embodiments, said data processing circuitry is configured in response to a clear multiple register instruction in said program code to clear values stored in multiple registers specified by said clear multiple register instruction.

It may be advantageous to have a clear multiple register instruction that can be executed by the processing circuitry. When switching from the secure domain to the non-secure domain values stored in the registers by the secure code executing in the secure domain should not be available to the non-secure domain. Thus, a convenient way of clearing these values may be to simply execute a clear multiple register instruction.

In some embodiments, said data processing apparatus comprises a secure configuration storage location for storing a value indicating which of said plurality of registers are available for use by currently executing code for storing secure state, said data processing circuitry being configured when transitioning from the more secure to the less secure state to clear said plurality of registers indicated by said secure configuration value.

When transitioning from a secure to less secure state, sensitive data stored in the registers should not be accessible to the less secure side and as such the registers should be cleared prior to transitioning. In some cases not all the registers will be used to store sensitive data and this may depend on the secure level of the domain and on the code being executed. If this is the case it is advantageous if this information is available stored in a secure configuration storage location such that the processing circuitry can simply clear the registers that may store sensitive data when switching to a less secure domain and the other registers will not need to be cleared, thereby saving time and power. In this regard it should be noted that in many cases before clearing the registers when executing in the secure domain the secure state will need to be saved in which case the secure configuration register is used to determine which registers this state is stored in and thus, which registers to save. Storing state from registers takes time and power and thus, being able to determine at any given time the number that it is necessary to clear and save is advantageous.

In some embodiments, said data processing circuitry comprising exception handling circuitry, said exception handling circuitry being configured to respond to receipt of an exception to clear said set of said registers, said registers within said set of said registers depending on a secure level of said domain of execution and said domain said exception is to be taken in.

When taking an exception that transitions between security domains the processing circuitry may need to clear the registers and it may also need to store state to the stack. The number of registers whose state needs to be cleared and possibly stored will depend on the domain the processor is operating in and the domain of the exception. For example when transitioning to a less secure state then a set of registers that may be used to store sensitive data should be cleared so that the data is not available to the less secure side. In this regard the set of registers is the registers that may be used by the currently executing code to store secure data. Thus it may be all the registers or it may just be some of them, this perhaps being indicated by the secure configuration value.

In some embodiments, said exception handling circuitry is configured: to respond to receipt of a further interrupt before said interrupt has been completed to perform no further stack storage operations except where: said interrupt is executed in said secure domain and said further interrupt is of lower or equal priority and indicates switching to said less secure domain, whereupon said data processing circuitry is configured to take said further interrupt after completion of said interrupt and: where said original code that was interrupted was in said secure domain to save said state stored in further registers such that said set and said further registers are stored to said secure stack and cleared; and where said original code that was interrupted was in said non-secure domain to clear said set of registers; said interrupt is executed in said secure domain and said further interrupt indicates switching to executing in said less secure domain and is of a higher or equal priority to said interrupt, said further interrupt is taken prior to completion of said interrupt and state stored in said set and said further registers are saved to said secure stack and said set and further registers are cleared.

A further circumstance where care needs to be taken to ensure that data does not leak between regions of different security is when an interrupt is received. Embodiments of the present invention can be used to control the interrupt process in a similarly efficient and safe way to the way it controls transitions in response to function calls. In this regard in general, a set of registers that holds the current state of a processor needs to be restored following an exception and should generally be stored to the stack on taking the exception. However, where one is going from a secure to a non-secure state then the values in all of the registers that may store sensitive data should not be available to the non-secure side and they may all need to be saved to the secure stack and cleared. Further problems occur where a further interrupt arrives before the first interrupt has completed. It may be that no further stack storage operations need to be performed however, there may be circumstances where further data storage is necessary.

For example, if the first interrupt is taken from the secure domain and is to execute in the secure domain and the further interrupt is of a lower priority and in the less secure domain then when the first interrupt has finished one is changing from the secure to the non-secure domain at which point the registers that are in the register set that store sensitive data but not in the subset that are generally stored to the stack (and thus, have already been stored) need to be stored to the secure stack. The registers can then safely be cleared without the loss of data before the further interrupt is executed.

In an alternative circumstance a first interrupt is taken from the less secure domain but is to be executed in the secure domain. When this occurs there are no security issues and thus just the subset of registers (that are the caller saved registers) are stored to the stack. However, if a further interrupt arrives which indicates switching to execution in a less secure domain then there is a switch from a secure to a less secure domain at which point care must be taken. Where the further interrupt is of a higher priority than the first interrupt then the further interrupt will be taken prior to completion of the first interrupt and states that are stored in the subset and the further registers in the set should be saved to the secure stack, and the registers cleared, this is assuming that the first instruction of the first interrupt has been executed. If not then the registers will not contain any secure data and do not need to be saved or cleared. However, where the further interrupt is of a lower priority then it is only taken after the first interrupt has completed and at this point the secure state is no longer required and does not need to be saved, however the set of registers that may store sensitive data should be cleared.

In some embodiments, said data processing apparatus comprises a secure configuration storage location for storing a value indicating which of said plurality of registers are available for use by a currently executing portion of code for storing secure state, said exception handling circuitry determining said subset and said further ones of said registers from said value stored in said secure configuration storage location.

It may be that the data processing apparatus has many registers but only some are used at any one time for storing secure state. In such a case, it may be advantageous to have a secure configuration value stored in a secure configuration storage location indicating which of the registers will be used for storing secure state. In such a case the set of registers can be determined from this value and only these need to be saved to the secure stack and the other registers can be left with their values intact. Similarly, only these registers will need to be cleared.

In some embodiments, said data processing apparatus comprises a storage location for storing an exception return value, said data processing circuitry being configured to set said exception return value to indicate a domain said data processing apparatus is operating in on taking of said exception, said exception handling circuitry determining which registers to update with values from said stack in dependence upon said value stored in said exception return value on return form an exception.

Handling interrupts in this way may require little additional hardware or software and may be low latency but it may require knowledge of the secure level of the domain from which the exception was taken. This may be important when determining which stack to update registers from and how many registers will have been stored to that stack. In particular, where the initial state was a secure state so that the set of registers have been saved to the secure stack to avoid them being seen by the non-secure state then this needs to be known so that all of these registers can be restored. As the number of registers that have their state saved to the stack varies depending on the security of the initial state and the security of the state that is being transitioned to when restoring the values information regarding the initial state may need to be known.

In some embodiments, said data store comprises a plurality of hierarchical secure regions for storing data of different sensitivities, data stored in a higher level secure region not being accessible by said data processing circuitry operating in a lower level secure domain;

said data store comprising at least one stack in each of said plurality of secure regions; wherein said storage location for storing said stack select flag comprises a plurality of bits; and; said data processing circuitry is configured to determine which stack to access for function arguments and return values in dependence on said stack select flag.

Although in some embodiments there may only be two regions a secure and non or less secure region, in other embodiments there could be a plurality of different regions having a plurality of different hierarchical secure levels. Thus, code executed in the most secure domain will have access to data stored in all regions while code executing in a less secure domain will only have access to data stored in its own secure region and in other lower secure regions. If there are such hierarchical secure regions then the stack select flag may need to comprise a number of bits to indicate the actual secure region that the stack to be accessed is in. In such a case the region indicated is the lower secure level of the two regions that the program code and function code are stored in. In this way, the flag indicates which stack to access for the function arguments and the return values.

In some embodiments, said data store comprises a plurality of secure regions for storing data of different sensitivities, at least two of said regions being sibling regions storing data of a same sensitivity, said data stored in said sibling regions being accessible to data stored in a higher level secure domain but not being accessible by said data processing circuitry operating in a lower level secure domain or in the other sibling secure domain; said data store comprising at least one stack in each of said secure regions and a further sibling stack that is accessible to program code stored in either of said sibling regions; wherein in response to program code stored in one of said sibling regions calling a function where said function code is stored in another of said sibling regions, said data processing circuitry is configured when executing said program code and said function code to access arguments to be used by said function and data to be returned from said function on said further sibling stack.

In addition to hierarchical secure levels there may also be certain regions which have the same secure level but are not accessible to each other, so called sibling secure levels. This may be advantageous where code from different providers is stored and neither wants the other to have access to their code. In such a case, there may be an additional stack which both of the secure regions can access and which can be used to store function arguments and return values when a function of one of the sibling secure levels is called from the other sibling secure level.

It should be noted that these sibling secure levels could be also present in a hierarchical system that has many secure levels.

A second aspect of the present invention provides a method of processing data on a data processing apparatus comprising: data processing circuitry for performing data processing operations in response to program code; a plurality of registers for storing data items processed by said data processing circuitry; and a data store for storing data, said data store comprising at least one secure region for storing sensitive data accessible by said data processing circuitry operating in said secure domain and not accessible by said data processing circuitry operating in a less secure domain and a less secure region for storing less secure data; said data store comprising at least two stacks a secure stack in said secure region and a less secure stack in said less secure region, said data processing circuitry being configured to transfer data between said stacks and said registers during processing; said data processing circuitry operating in said secure domain when processing program code stored in said secure region and operating in said less secure domain when processing program code stored in said less secure region; said method comprising the steps of: executing program code stored in said data store; determining which stack to store data to, or load data from, in response to said storage location of said program code being executed: and in response to program code stored in a first region calling a function to be executed, said function code being stored in a second region, said second region having a different secure level to said first region, determining which of said first and second region have a lower secure level and when executing said program code and said function code accessing said stack of said first or second region with said lower secure level for function arguments and return data values.

A third aspect of the present invention provides a computer program product comprising a register stack load instruction, which when executed by processing circuitry controls said data processing circuitry to: load at least one register that is specified by said register stack load instruction with a value from at least one location on a stack; and to determine whether said stack comprises a secure stack in a more secure region of a data store or a less secure stack in a less secure region of a data store in dependence upon a stack select flag.

A fourth aspect of the present invention provides a computer program product comprising a register stack store instruction, which when executed by processing circuitry controls said data processing circuitry to: store at least one value in at least one register specified by said register stack store instruction in at least one location on a stack; and to determine whether said stack comprises a secure stack in a more secure region of a data store or a less secure stack in a less secure region of a data store in dependence upon a stack select flag.

A fifth aspect of the present invention provides a computer program product comprising a stack select flag set instruction, which when executed by processing circuitry controls said data processing circuitry to: determine whether a target address of executable code that is stored in a register specified by said instruction, is in a less secure region than a current operating region and if so to set said stack select flag to indicate said less secure region.

A sixth aspect of the present invention provides a computer program product comprising a further flag set instruction, which when executed by processing circuitry controls said data processing circuitry to: determine whether a target address of executable code that is stored in a register specified by said instruction, is in a less secure region than a current operating region and if so to set said stack select flag to indicate said less secure region and to set a further flag.

A seventh aspect of the present invention provides a computer program product comprising a clear multiple register instruction, which when executed by processing circuitry controls said data processing circuitry to: clear values stored in multiple registers specified by said clear multiple register instruction.

An eighth aspect of the present invention provides a data processing apparatus, said data processing apparatus comprising: data processing means for performing data processing operations in response to program code; a plurality of registers; and a data store means for storing data, said data store means comprising a plurality of regions having different secure levels, and comprising at least one secure region for storing sensitive data accessible by said data processing means operating in said secure domain and not accessible by said data processing means operating in a less secure domain and a less secure region for storing less secure data; said data store means comprising at least two stacks a secure stack in said secure region and a less secure stack in said less secure region; said data processing means operating in said secure domain when processing program code stored in said secure region and operating in said less secure domain when processing program code stored in said less secure region; wherein said data processing means is for determining which stack to store data to, or load data from, in response to said storage location of said program code being executed; and in response to program code stored in a first region calling a function to be executed, said function code being stored in a second region, said second region having a different secure level to said first region, said data processing means is for determining which of said first and second region have a lower secure level and when executing said program code and said function code, accessing said stack of said region with said lower secure level for function arguments and return data values.

A ninth aspect of the present invention provides a data processing apparatus comprising:

data processing circuitry for performing data processing operations in response to program code;

a plurality of registers; and a data store for storing data, said data store comprising a plurality of regions each region having a secure level, and comprising at least one secure region for storing sensitive data accessible by said data processing circuitry operating in said secure domain and not accessible by said data processing circuitry operating in a less secure domain and a less secure region for storing less secure data;

said data store comprising at least two stacks a secure stack in said secure region and a less secure stack in said less secure region; wherein said data processing circuitry comprises exception handling circuitry, said exception handling circuitry being configured to respond to receipt of an exception when said data processing circuitry is executing in said secure domain and said interrupt indicates switching to executing program code in a less secure domain to clear a set of said registers, said registers within said set of said registers depending on a secure level of said domain of execution and said domain said exception is to be taken in. The present invention recognises that in processing apparatus that have multiple secure states the taking of an exception may transition the processing circuitry between different secure levels.

Exceptions may be asynchronous exceptions such as interrupts caused by an external event or synchronous exceptions caused by the program either deliberately or in response to a fault. In either case if transitioning from the secure to the non-secure state at least some registers will need to be cleared and in some cases they may need to have their state stored to the stack if the security of the data is to be maintained. The number of registers whose state needs to be cleared will depend on the domain the processor is operating in and the domain of the exception. For example when transitioning to a less secure state then a set of registers that may be used to store sensitive data should be cleared so that the data is not available to the less secure side. When taking an exception that does not require a transition to a less secure state then generally no registers will need to be cleared. The present invention provides exception handling circuitry that can respond to these transitions to clear the required registers thereby avoiding the need for proxying interrupts.

In some embodiments, said data processing circuitry is further configured to save state stored in said set of said registers to said stack of said domain said data processing circuitry is executing in prior to clearing said set of said registers.

Although when transitioning to a less secure state the registers storing secure state must always be cleared, in many embodiments this state should be preserved and thus, it is saved to the stack. This is a fairly power and time hungry process and thus, being able to specify the registers required enables the number to be limited and improves performance. In this regard when taking an exception where there is no transition to a less secure level then fewer registers need to be saved to the stack than where one does transition to a less secure level. In some embodiments only the caller saved registers will need to be saved unless the exception causes a transition to a less secure state, in which case any register that stores sensitive data will need to be cleared to avoid that data being visible to the less secure side and if that data should not be lost it will need to be saved.

The above, and other objects, features and advantages of this invention will be apparent from the following detailed description of illustrative embodiments which is to be read in connection with the accompanying drawings.

BRIEF DESCRIPTION OF THE DRAWINGS

FIG. 3B shows instructions according to an embodiment of the present invention;

FIG. 8A shows the state that is saved when a first exception and then a second exception are received;

FIG. 8B shows the registers whose states are saved to the stack on taking of an interrupt;

DESCRIPTION OF THE EXAMPLE NON-LIMITING EMBODIMENTS

Figure 1:
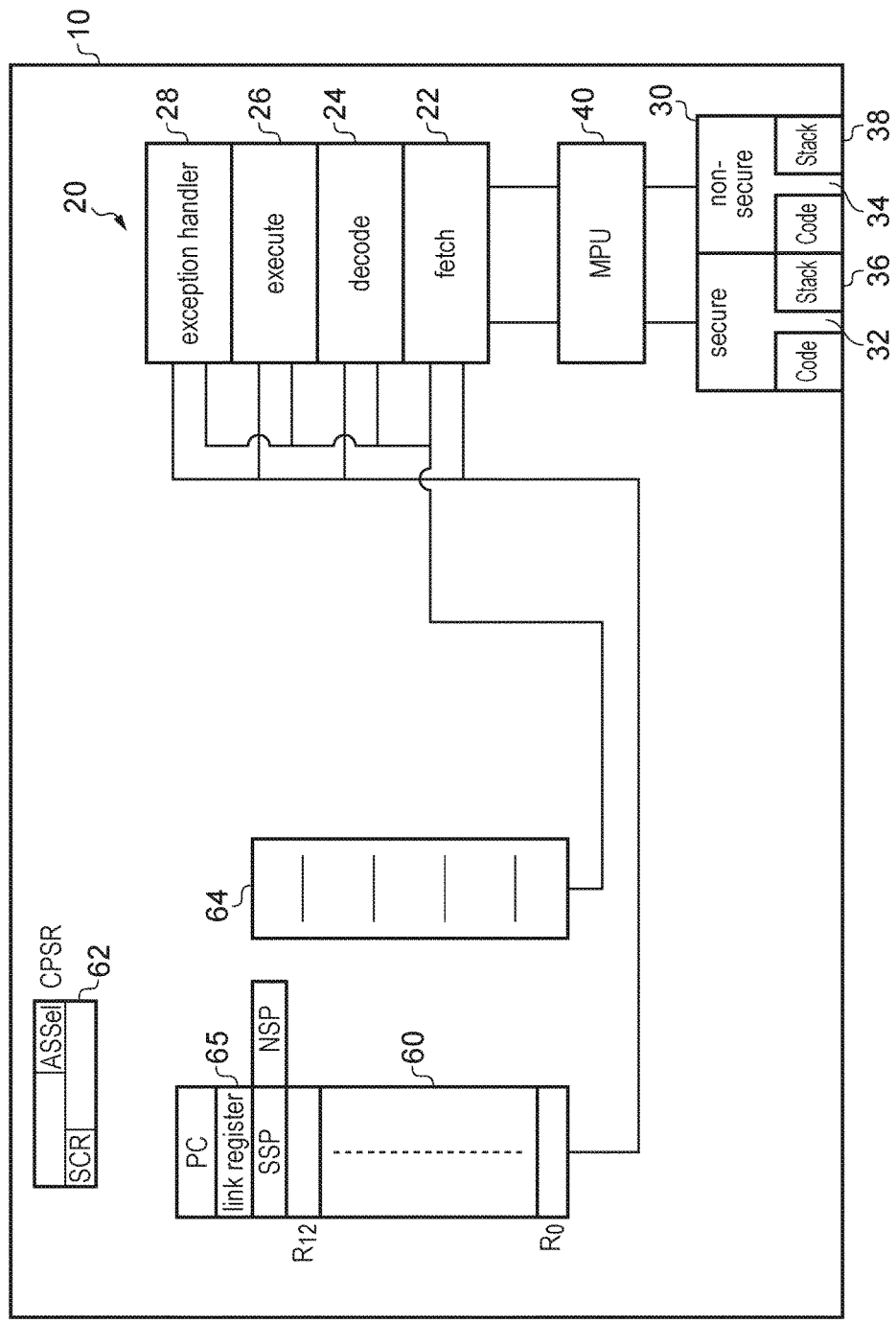
FIG. 1 shows a data processing apparatus according to an embodiment of the present invention having a data store with a secure and non-secure region.

FIG. 1 shows a data processing apparatus 10 which may for example be a microcontroller. It comprises processing circuitry 20 for processing instructions and a data store 30 for storing data that is processed by the processing circuitry 20 and also for storing the program code that the processing circuitry 20 executes.

Data store 30 has two regions of different security, a secure region 32 and a non-secure region 34. Data stored in the secure region 32 is not accessible to code that is stored in the non-secure region 34 when it is executing.

Data processing apparatus 10 also has a memory protection unit MPU 40 which controls access to the secure 32 and the non-secure 34 regions. Although this control may be done through a memory protection unit, it may in other embodiments be done in a more distributed fashion by circuitry within the processing apparatus that monitors the region code that is currently being executed is stored in, and controls access to the different regions of the memory in dependence upon this.

In this embodiment, the secure domain that the processing circuitry 20 is executing in is determined from the region that the code currently being executed is stored in. Thus, secure program code stored in secure data store 32 is executed in the secure domain and uses secure stack 36 to store data values in. Similarly non-secure code stored in non-secure data store 34 uses non-secure stack 38 for storing data values during execution.

Processing circuitry 20 has fetch circuitry 22 for fetching instructions to be executed. It has decode circuitry 24 for decoding these instructions and execution circuitry 26 for executing them. There is also exception handling circuitry 28 which will be described later.

Instructions to be executed are fetched by fetch circuitry 22 from data store 30 via the memory protection unit MPU 40. The instructions and data are retrieved via MPU 40 which controls the access to the secure and the non-secure regions and isolates the secure data from the non-secure side.

In this embodiment there is a register bank 60 which has general purpose registers which are used during data processing. These general purpose registers have a program counter PC which indicates which instruction is the next to be executed and a stack pointer SP which indicates at which point in the stack the next data access should be made. In this embodiment as there is a stack in the secure side and a stack in the non-secure side there is a secure stack pointer and a non-secure stack pointer, but only one of these is directly visible to the program being executed at any one time. It should be noted that in some embodiments there may be plural stack pointers for each stack but again only one will be visible at any one time.

There are also general purpose registers for storing data values that are being processed in register bank 60. In this embodiment these are marked as R0 to R12. In this case registers R0 to R3 can be used to transfer values between a function and a program that calls the function, any of these registers that are not required for this purpose must be cleared before transitioning to a less secure domain. Where there are more arguments or return values than can be stored in registers R0 to R3, then these will need to be saved off to a stack when transitioning between the function and program that called it. In this regard, by designating certain registers for holding these values one reduces the number of values that need to be saved to the stack, thus saving time when transitioning between functions and programs, however, if an excessive number are designated then the system will be not be efficient in other regards. In this embodiment four registers are used for this purpose but it should be clear to a skilled person that a different number could be used. Alternatively, in some embodiments registers are not used for storing data values and the values are stored on the stacks and are accessed indirectly via the stack pointer. This clearly has an area saving but a performance hit.

When code from the non-secure side is being executed and it calls a function and the MPU 40 determines that the function code is stored in the secure side then any arguments that do not fit in registers R0 to R3 will need to be stored on the stack 38 on the non-secure side. In this embodiment stack select flag ASSel in the CPSR register is set by stack select flag setting circuitry within the processing circuitry 20 when it determines that a secure function is to be called from non-secure program code. This indicates to the execute circuitry 26 that any arguments for that function that are stored on a stack need to be accessed from the non-secure stack 38.

When the function is executing it will use the secure stack 36 as it is a secure function and on finishing will return to the program code on the non-secure side and the secure function will know from the value of the select flag ASSel that it should store return values (that don't fit in R0-R3) to the non-secure stack 38. Registers that are available to store sensitive data, (these can be determined from the secure configuration SCR value stored in a configuration register 62) are then cleared.

In this regard the flag can be set automatically based on security domain information from the MPU hardware 40 on transitioning from a lower to a higher security level to indicate the lower security level stack should be used for arguments and return values and it can be cleared automatically if a function is called at the same security level or on transitioning from a higher to a lower security level. However, there are times when the flag needs to be set by software as this automatic hardware setting will not always result in the flag having the correct value. This is described with respect to later embodiments.

In this way data values are transferred between the two domains using the non-secure stack, in a straightforward and simple manner which is generally managed by the hardware and is efficient.

It should be noted that although the MPU is described as providing information about security domain transitions, which is used in setting the flag, the circuitry that determines this information could be located elsewhere in the data processing apparatus. In this regard in some embodiments there may be accesses to the data store via peripherals such as DMA (direct memory access) controllers and if these do not access the data store via an MPU, then the isolation of the secure state from the non-secure side must be implemented by circuitry that the DMA is also subject to, FIG. 1 also shows an additional register bank 64 which has additional special purpose registers such as floating point registers. Register bank 60 also comprises a link register 65 that may be used to store a return address when an exception is taken or a function is called. This register may alternatively store an $EXC_{13}$ RETURN value which indicates the secure level of the domain that an exception was taken in, this enables the processor to know which stack to access when restoring state and how many registers need to be loaded and this shall be described later.

In summary, it is possible to overcome the inter domain calling problems and maintain the security associated with multiple stacks by using the ASSel (Alternate Stack Select) flag in the program state register (CPSR). This flag may be automatically set to 1 by the hardware when a function call occurs, if memory control logic determined the call caused a transition to the secure state. Function calls to the non secure state, and within the same state would set the flag to 0. As such this flag indicates to the callee function which of the banked stack pointers (i.e. the one associated with the current security state, or the non secure pointer) should be used to access function arguments and return values. Access to these values may be provided via some new indexed load and store instructions which, unlike most existing load/store instructions do not explicitly specify the base address register, but instead automatically select the correct stack pointer as the base address based on the ASSel flag. These instructions are described later. An external API function belonging to the secure state must save and restore the ASSel flag around any sub-function calls if access to the function arguments or return values on the stack is required after the sub-function returns. This allows secure functions to be called from either the secure or non secure domain whilst still maintaining the ability to pass values via a stack. The exception handling circuitry 28 will control the taking of exceptions and where these exceptions result in a transition from a more secure to a less secure state a set of registers that may store sensitive data will be cleared prior to the taking of the exception to avoid data stored in these registers being available to the non-secure side. The state stored in these registers will be stored on the secure stack such that on return from the exception the state can be restored.

Figure 2:
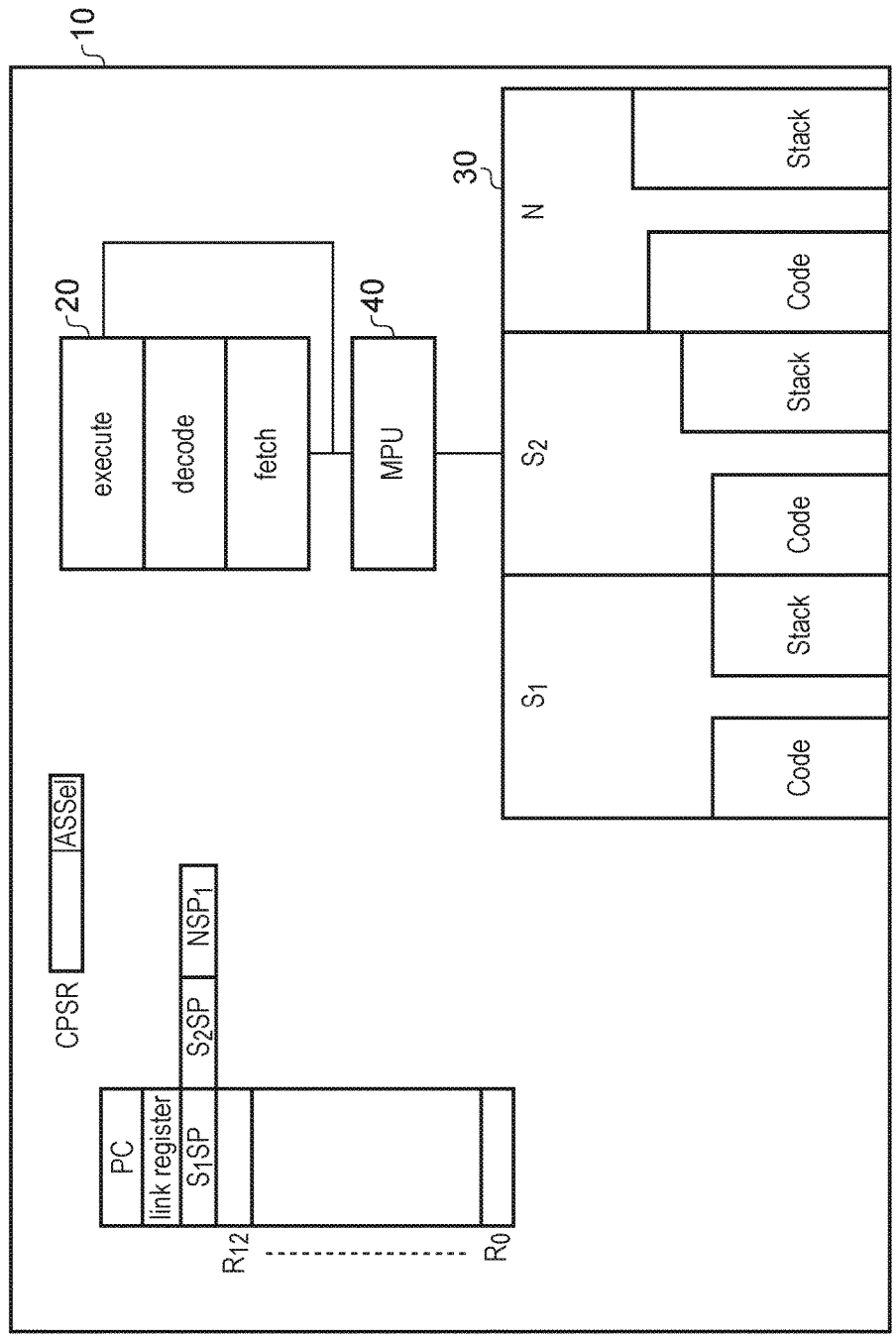
FIG. 2 shows a data processing apparatus according to an embodiment of the present invention having a data store with two different secure and a non-secure region.

FIG. 2 shows a data processing apparatus 10 of an alternative embodiment to FIG. 1 where there are two secure regions S1 and S2 within data store 30, with S2 being more secure than S1. In this embodiment each region has its own stack. Thus, there are three stack pointers although only one is directly visible to the program being executed 20 at any one time.

As noted previously the stack select flag ASSel within the CPSR can be used to determine which stack should be used for storing arguments or return values of functions that are executed in a different secure domain to the program that called them. Where there are several different secure levels then a multiple bit flag value will be needed to indicate the appropriate level. The flag can be set automatically based on information from the MPU hardware on transitioning from a lower to a higher security level to indicate the lower security level and it can be set to indicate the current security level if a function at the same security level is called or when transitioning from a higher to a lower security level. There are times when the flag will need to be set by software as this automatic hardware setting will not always result in it having the correct value.

Figure 3A:
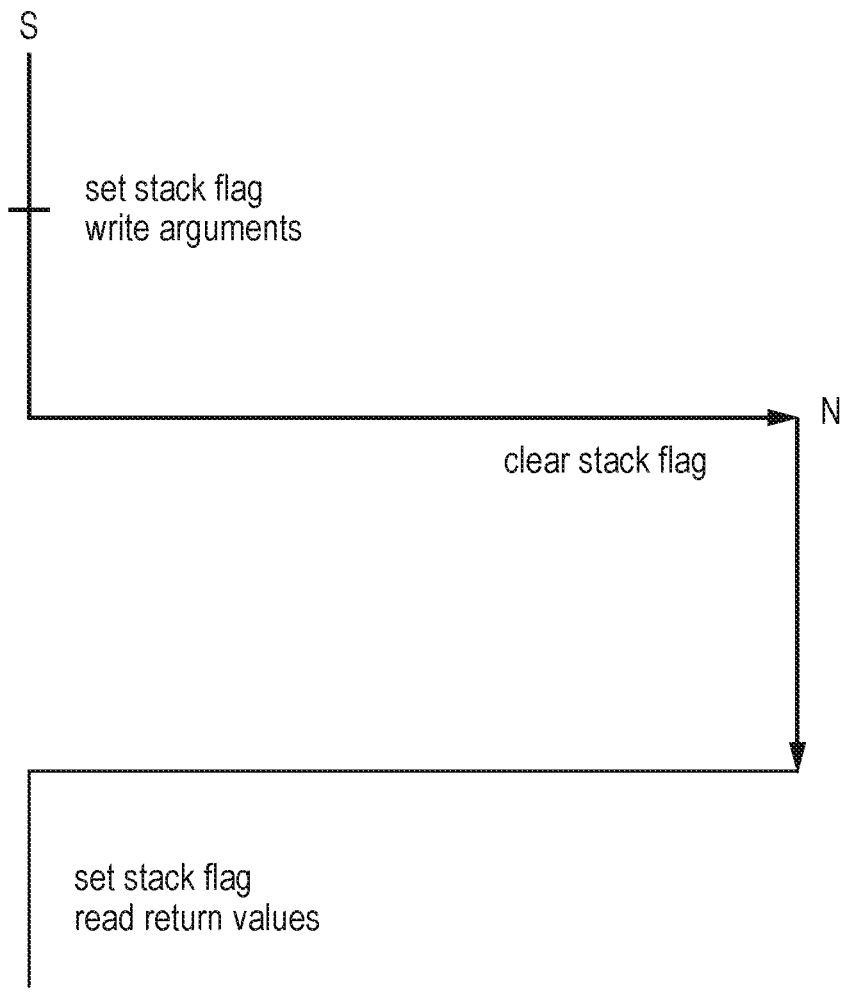
FIG. 3A illustrates schematically the calling of a non-secure function from a secure program.

One example of the setting of the flag by software is described with respect to FIG. 3a. FIG. 3a shows schematically a secure program that calls a non-secure function, the program and function being executed by the processing apparatus of FIG. 1. In this case there is a stack select flag set instruction within the program code which sets the ASSel flag prior to calling the function. This indicates to the processing apparatus that the arguments required for the function should be stored on the non-secure stack. Generally program code executing in the secure state will use the secure stack 36 and thus, this instruction is required to avoid the arguments being stored on this stack. Thus, once this flag has been set if there is a store to stack instruction, then the ASSel flag will indicate to the processing circuitry that the stack to be stored with these values is the non-secure stack.

When the function is called the MPU 40 will detect the transition to the non-secure domain, in that the code now to be executed is stored in the non-secure side 34 and the flag will be cleared. At this point the processing circuitry will be executing in the non-secure domain and therefore the non-secure stack 38 will be used. On return to the secure domain the ASSel flag must be set again by an instruction if any return values are passed via a stack, indicating to the processing circuitry that the non secure stack 38 should be used when accessing the return values. Once access to the return values of the non secure function is no longer required a further instruction should be used to clear the ASSel flag, leaving the secure domain in a consistent state for any further potential function calls or returns.

It should be noted that the instruction to set the ASSel flag may be a simple select stack flag instruction or, it may be a determine a secure level of the target address and then set flag accordingly, instruction which may be used where it is not clear from the code which domain the function is to be executed in.

In this regard, embodiments of the invention employ instructions that enable this behaviour and these are set out in the table shown in FIG. 3b.

Thus, there is a load stack instruction that indicates the stack that a register to be loaded with a value from depends on the value of the ASSel flag. It specifies the register that is to be loaded from the stack and the address that it is to be loaded from as an offset of the stack pointer of that stack.

There is a store stack instruction that again indicates the stack depends on the ASSel flag. It specifies the register and the address that it is to be stored to as an offset of the stack pointer of that stack.

There is an NSBT instruction which can be used to indicate a valid entry point into the secure domain from the non-secure domain.

There is a multiple register clear instruction that can be used to clear multiple registers specified by the instruction and can be used to ensure that data on a secure side is not visible to a less secure side.

There are also instructions that test the secure state of a target address and can be used to set the ASSel flag appropriately. These are useful where the flag needs to be set by software but it is not clear in advance what value it should have as it is not clear what the secure domain of the function called will be. In some cases the instruction may set a further flag that can be used for conditional instruction execution where the domain of the function may affect what operations are to be performed. There are in some instruction sets, conditional instructions whose execution is dependent on the value of a flag, thus, setting this flag in dependence on the secure domain of the function will enable execution of the conditional instruction to be dependent upon the secure domain.

A simple pragma could be used to indicate to the compiler that a function is part of the interface between security domains and that the new instructions listed in FIG. 3b are needed when accessing function arguments and results. This pragma would also indicate to the compiler that the register values of the secure state need to be protected. When returning from a call into the secure domain the following steps could be used:
Clear R0-R3 if not used to hold the return value
In the case of a call to the non secure domain the following steps should be performed:
Clear R0-R3 if not used to hold the function argument
R4-R12 should be treated as caller saved registers and cleared before the function call.

Figure 4:
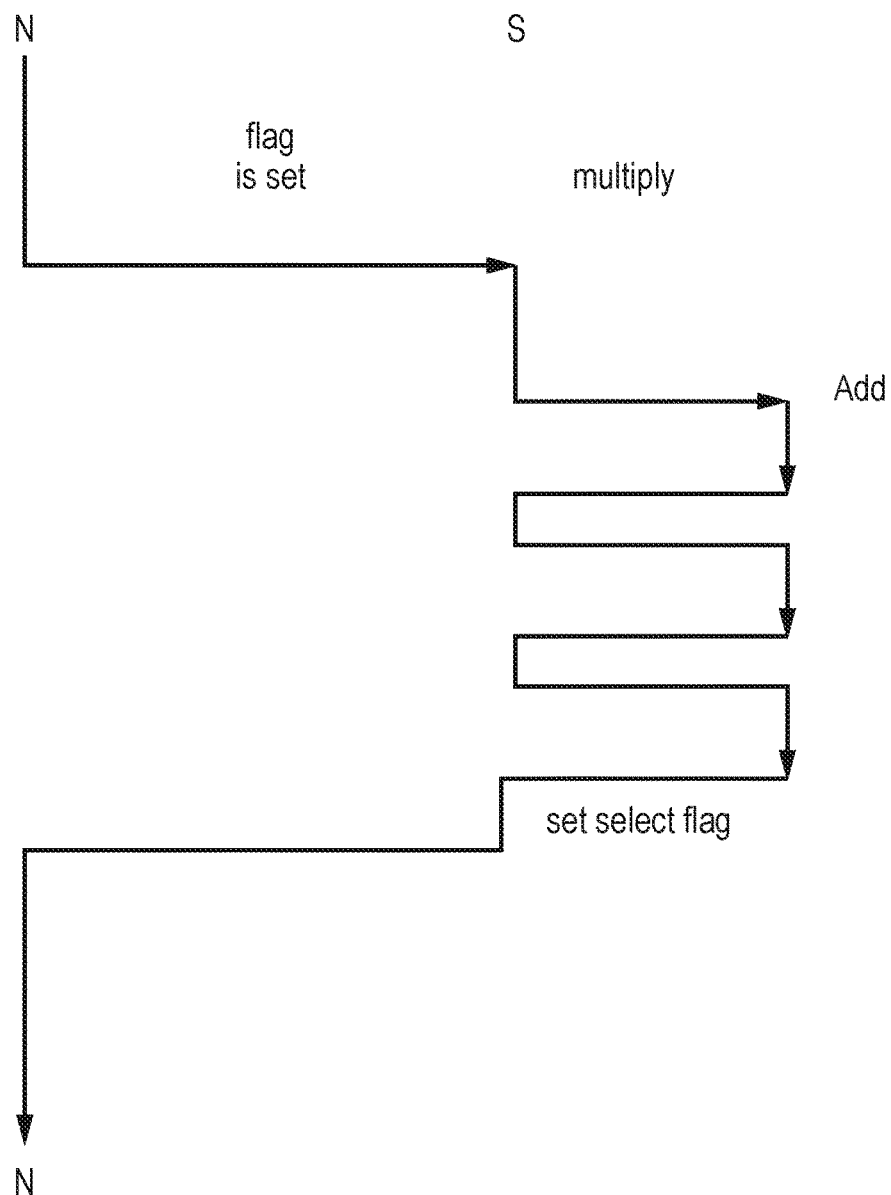
FIG. 4 schematically shows the calling of secure functions from a non-secure program.

FIG. 4 shows a further simplified example where one may need to set the select stack flag using an instruction. In this case there are two domains and a secure function is called from the non-secure domain. When transitioning from the non-secure to the secure domain the flag is set. The function is a floating point multiply function and in this embodiment it is implemented by multiple add functions that are called one after the other and which are all secure function. The calling of a secure function from a secure domain will clear the ASSel flag and therefore the ASSel flag will be cleared when returning to the non-secure domain. If the ASSel flag is cleared then the return values that need to be sent to the non-secure domain will be stored in the secure stack and will not be accessible. It is therefore important that there is a set select flag instruction that is executed before these values are stored. If it is not clear that one is returning to the non-secure domain one can use the TTS instruction of FIG. 3b where the target address is examined and the ASSel flag set in dependence upon this.

Figure 5:
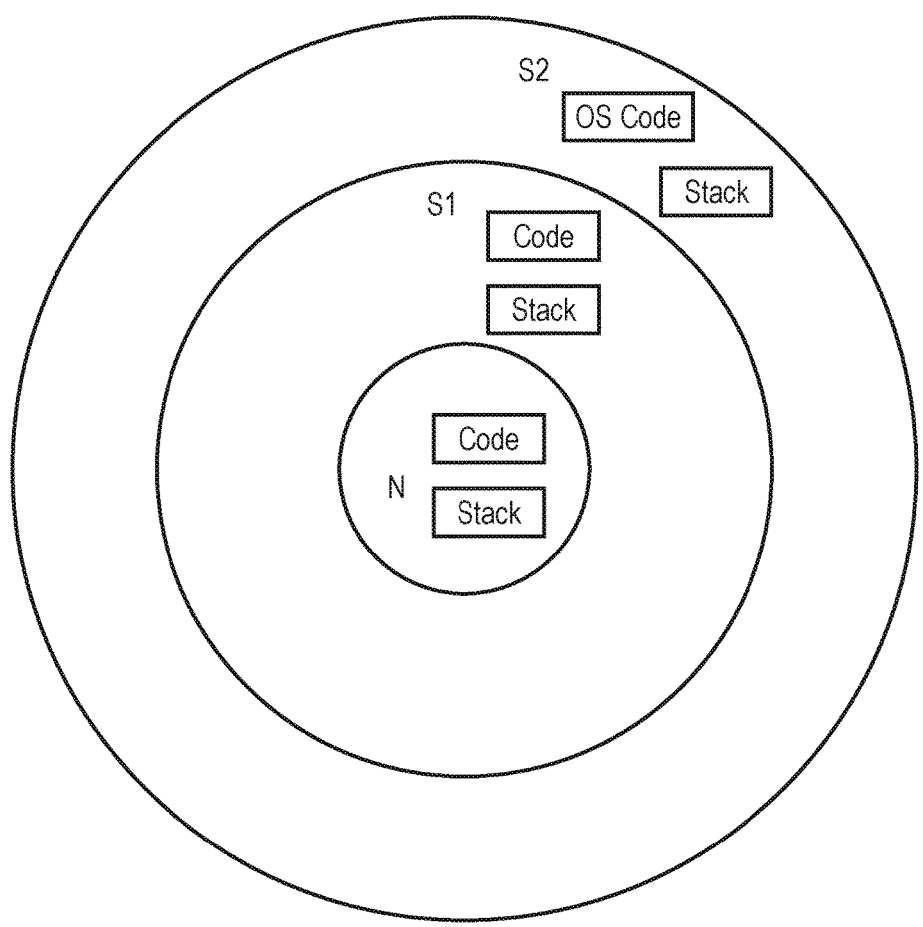
FIG. 5 schematically shows the hierarchical structure of several secure domains.

As noted previously, although two secure domains are often described, there may be a plurality of secure domains. FIG. 5 schematically shows a plurality of domains arranged in a hierarchy. There is a non-secure domain having code and data stored within it and having its own stack, a first secure domain S1 and a more secure domain S2 in which the operating system code is stored. Each of these different secure domains have their own stack and where transitions between the domains, require data values to be sent between them, then the stack of the less secure of the two domains can be used to store the values as they can then be accessed by both domains, and this storing and loading of function arguments and return values can be controlled by embodiments of the present invention.

Figure 6:
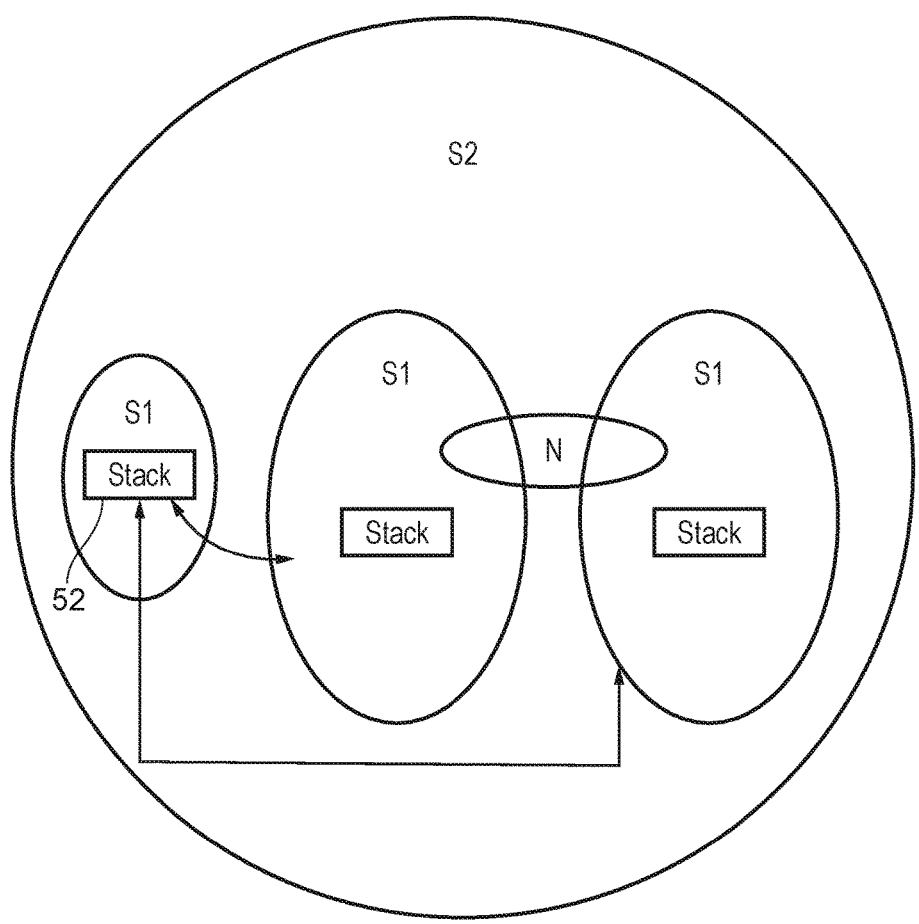
FIG. 6 schematically shows the hierarchical structure of several secure domains including sibling domains.

In other embodiments, there may be two sibling secure domains with the same secure level but with no access being allowed between them. FIG. 6 shows such an arrangement. Such a set up may be advantageous where two vendors are perhaps supplying software for use on the same system and they do not wish each other to have visibility of their software. Thus, although they may have use of the software they are not allowed to see how it is implemented. In such a case there will be an additional region of the same security in which there is a stack 52 which can be used to store arguments and return values where a function in one of the sibling S1 domains is called by code stored in the other sibling S1 domain.

A further way in which the control of data between domains is required is in the taking of interrupts. In some architectures part of the register state is automatically saved and restored by the hardware when an interrupt occurs and completes. By extending such an architecture to save and clear the whole register state or at least all of the register state that the secure domain uses, in the event that the interrupt causes a secure to non secure transition the hardware can maintain the security around interrupts.

Figure 7:
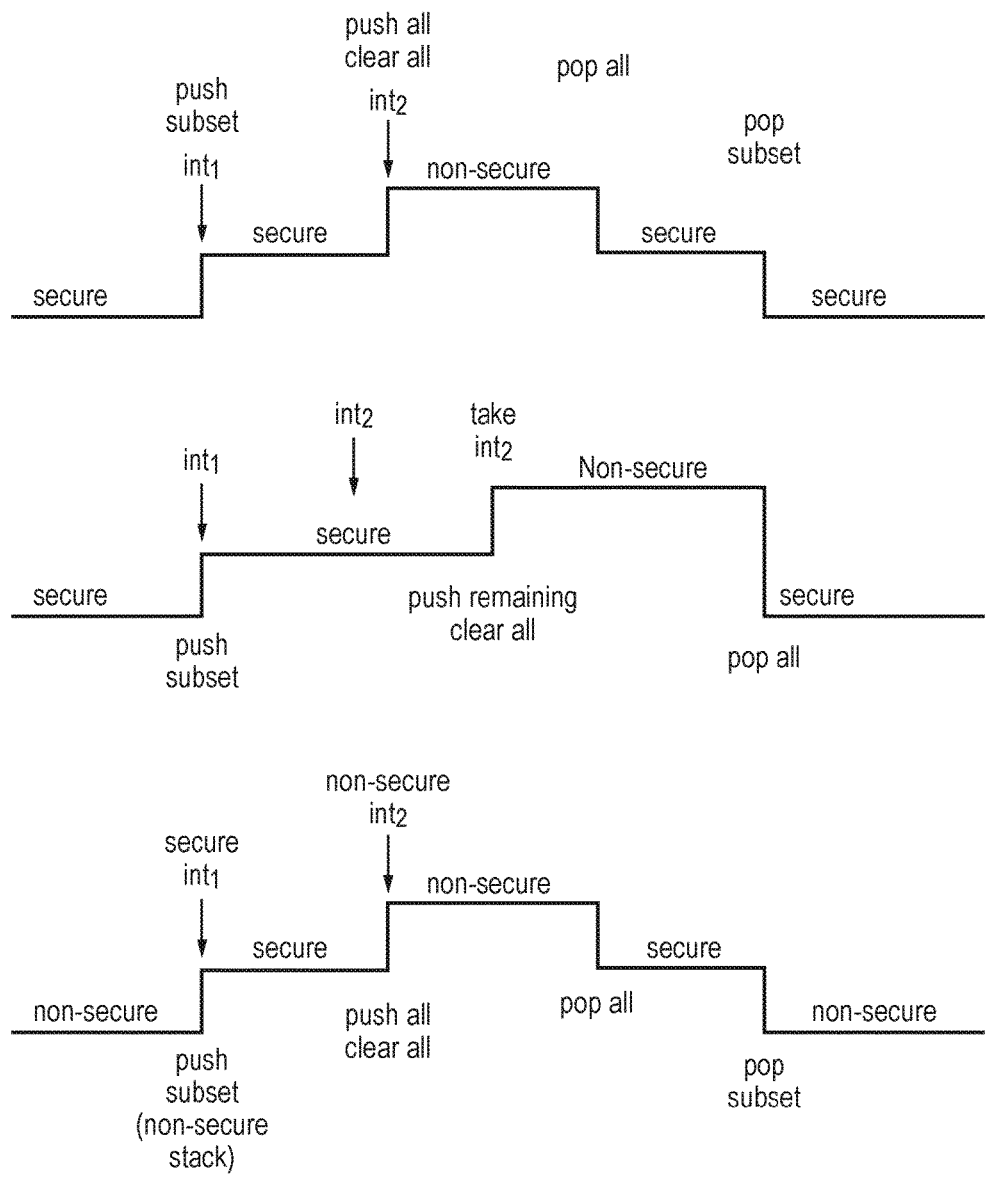
FIG. 7 schematically shows the taking of interrupts during code execution.
Figure 7:
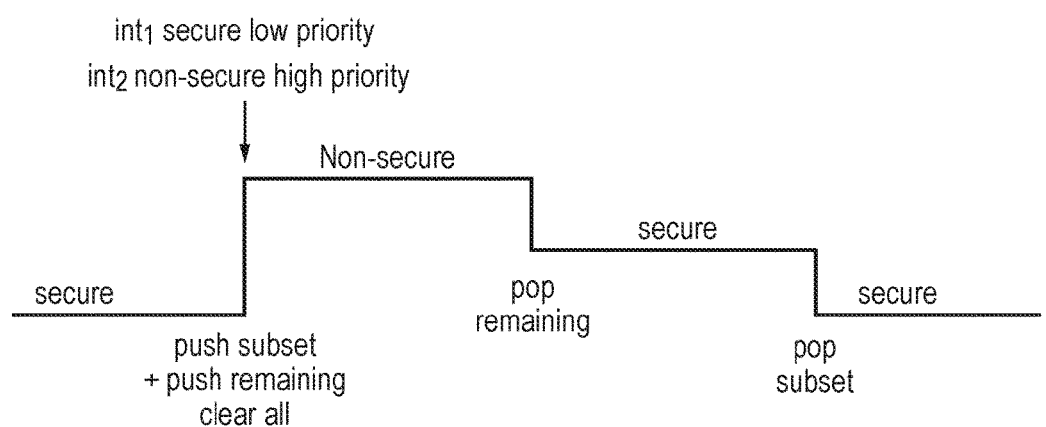

As noted above it is possible to remove the requirement to proxy interrupts through the secure state by extending the automatic register stacking system of embodiment of the present invention and allow the processing circuitry to push all registers to the stack (instead of just the caller saved registers), and then clear their values before switching to the non secure state and jumping to the interrupt vector. To keep the interrupt latency as low as possible the additional register state is only pushed onto the stack when transitioning from a secure to the non secure state. This introduces a few complexities when higher priority exceptions occur during exception entry, or when tail chaining exceptions. FIG. 7 shows some examples.

In the first example program code is executed in the secure state and a first secure interrupt is received. A subset of the registers are saved to stack and then a second higher priority interrupt that operates in the non-secure domain is received. As it operates in the non-secure region none of the information in the secure registers should be visible to the new application and thus, all the secure registers should be saved to the secure stack and then cleared prior to taking this interrupt. When the second interrupt has completed one returns to the non-completed initial secure interrupt and the registers that were pushed to the secure stack in response to the second interrupt can be restored. This first secure interrupt can complete whereupon the original subset that were pushed to the stack can then be restored.

In the second example the second interrupt has a lower priority than the first interrupt and will therefore complete before the non-secure second interrupt is taken. Once the first interrupt has completed then the remaining registers are pushed to the secure stack and all the registers are cleared before the non-secure interrupt is taken. At the end of the non-secure interrupt all of the registers that have been pushed to the secure stack are restored.

The third example shows non-secure code that receives a secure interrupt whereupon there is a partial save of the registers. If a second non-secure interrupt is then received with a higher priority all of the secure registers will be need to be pushed to the secure stack and cleared before it can be taken. When the non-secure interrupt is completed all the secure registers need to be popped from the stack and then when the secure interrupt is completed the subset of non-secure registers is popped.

The fourth example shows secure code that receives a secure interrupt that causes the caller saved registers to be pushed to the secure stack, before this process is complete a second higher priority non secure interrupt occurs. This second interrupt causes the remaining registers to be pushed after the subset is completed, resulting in a push of all the registers being performed. All the registers are then cleared before the non secure interrupt is taken. Upon completion of this interrupt the callee saved registers are popped from the secure stack before the secure interrupt is taken. When the secure interrupt is completed the original subset of the registers are popped from the secure stack.

FIG. 8A shows a table indicating potential interrupts and the state saving that needs to be performed. In this regard push subset is the pushing of the caller saved subset of registers onto the stack, while push all is the pushing of the entire register state onto the stack apart from the stack pointer. In this regard where some registers are not available for storing sensitive data and this is known then these registers may not need to be pushed onto the stack. Push remaining is pushing the callee saved subset of the register state onto the stack, when combined with push subset this is equivalent to the push all state.

In the table the exception entry column indicates a second interrupt that has a higher priority than the first interrupt and occurs before the branch to the first interrupts exception vector and is therefore taken before the first interrupt completes. The exception return column indicates a lower or equal priority interrupt that is not taken until the first interrupt completes.

In this regard there are registers that the caller function is responsible for and registers that the callee is responsible for, thus, the resisters that the caller function is responsible for are stored to the stack prior to taking the function. However, when transitioning from the secure to the non-secure state the values in all registers that can save secure state need to be removed from the registers so they are not available to the non-secure side and thus, additional saving and clearing is performed as is clear from table 8A.

FIG. 8B shows a register stack of an embodiment of the present invention and the partial stack frame that is saved when taking an interrupt from the same or less secure state and the full stack frame that is saved when transitioning to a less secure state. In this regard more registers need to be saved and cleared in the latter case as the registers cannot be left storing any state as this is secure state that must not be available to a less secure state.

When program code transitions between secure states perhaps when calling a function the number of registers to be stored to the stack will depend on the states and can be indicated by a value in the secure configuration register such that the saving of state and the clearing of registers can be limited by using this value. This value may be set by the compiler for a particular apparatus and this allows a particular apparatus to be used in different ways and provides some flexibility in the product, in other embodiments it may be set by software, perhaps when the system is booting.

As noted the processing circuitry automatically pushes and pops the caller saved sections of the register state to the stack when an exception occurs, and if necessary changes which stack pointer and thus which stack is used. This allows the following advantages to be present even in a system with secure and less secure domains: Reduced interrupt latency; Reduced interrupt jitter; Exception handlers can be written in C instead of assembler; Enables optimisations like exception on exception entry, and tail chaining.

In order for the core to be able to know which stack to restore the register state from when the exception returns, and which mode the core should return to, the link register may hold a special EXC_RETURN value rather than the return address. This indicates to the processing apparatus the secure level of the domain the processing circuitry was in when the exception was taken. The actual program counter location to return to is stored on the stack of this domain along with the other register state. In this case the EXC_RETURN value in the link register indicates that the return address is on the stack and which stack this is.

Figure 9:
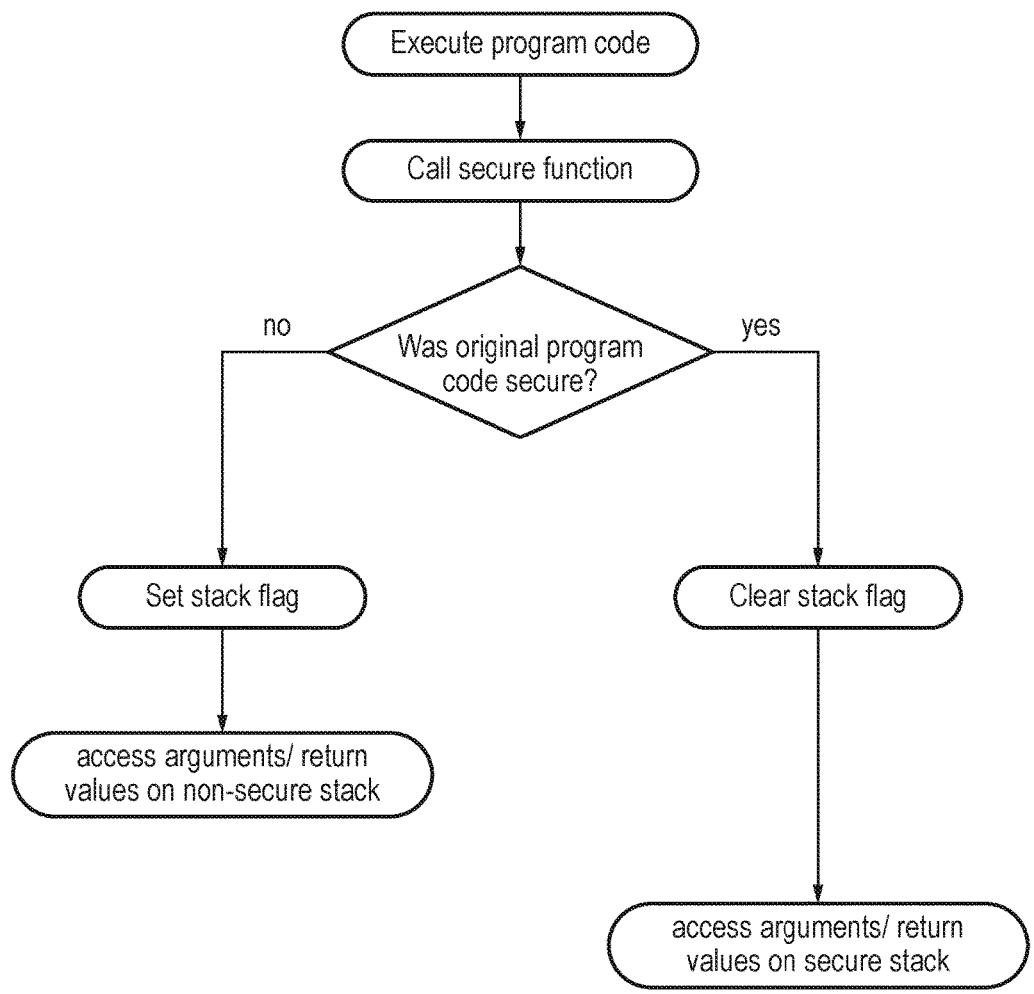
FIG. 9 shows a flow diagram illustrating steps in a method according to an embodiment of the present invention.

FIG. 9 shows steps in a method according to an embodiment of the present invention, where there is a secure and non-secure domain. Initially program code in the either domain is executed and a secure function is called. It is then determined if the function call was from a secure domain or not. If it was not then the stack select flag is set. If it was the flag is cleared. This is generally done when the processing circuitry transitions between the states and retrieves code from either a same or different region of the data store, this retrieving of code causing the hardware to set or clear the flag. It is then determined if the stack select flag is set. If it is then arguments and return values are accessed on the non-secure stack. If it is not set then the arguments and return values are accessed on the secure stack. In this way a secure function and non-secure program can both access these values, while a secure function and secure program both have access to the secure stack.

Figure 10:
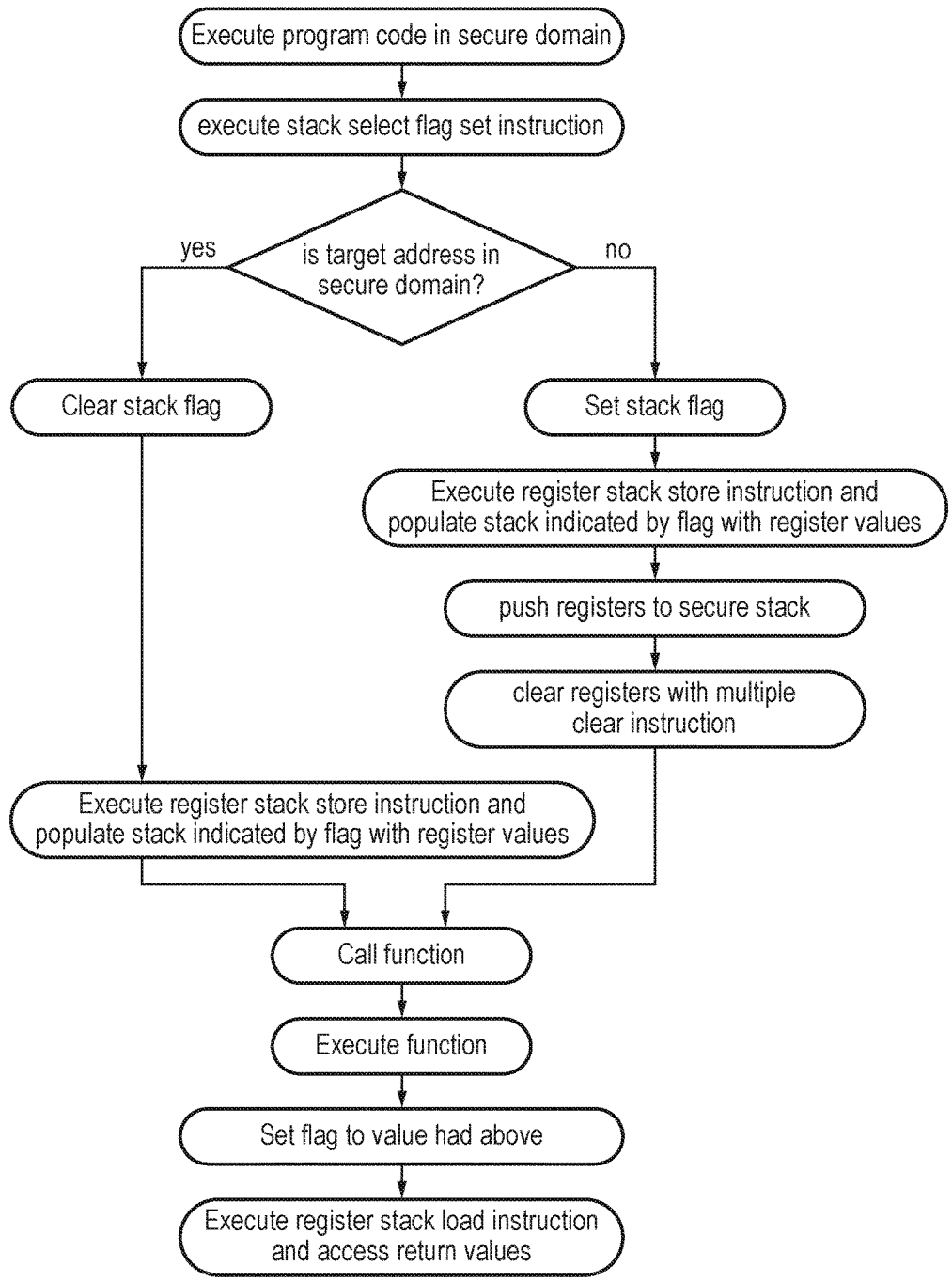
FIG. 10 shows a flow diagram illustrating steps in a method where instructions according to an embodiment of the present invention are executed.

FIG. 10 shows steps in a method according to an embodiment of the present invention, where program code is executed in the secure domain and a function is called. A stack select flag set instruction is executed prior to calling the function and if the target address is in the non-secure domain, then there is a domain transition and stack flag is set, if not the stack flag is cleared. The register stack store instruction is then executed and dependent on the value in the stack flag the appropriate stack is populated with the arguments that are required for the function to execute. The register stack store instruction indicates an offset to the stack pointer and the stack pointer for the stack indicated by the stack flag (set non-secure, clear secure) is used. Where the function is not in the secure domain then the registers need to be stored to the secure stack to save state and then cleared, this can be done by hardware or by the clear register instruction or by both. In this regard the hardware may automatically clear secure registers that do not hold function arguments, but those that may hold function arguments are not cleared. Where a register that can store a function argument is not being used for a function argument then an instruction that clears it is required.

The function is then called and executed, upon return the stack select flag is set/cleared to the value it had previously to indicate the stack pointer that should be used to access any return values. In this regard setting it to the value it had previously could be done by storing the previous value and then restoring it, or the test instruction that determines where the target address could be used to determine what state transition has occurred. The register stack load instruction may then be executed and the return values for the function loaded from the appropriate stack.

In some embodiments where it is known that the function is a non-secure function a simple set stack flag instruction that does not need to test the target address can be executed.

Alternatively in some cases a set stack and further flag instruction can be used. In this regard, it should be noted that the two paths through the flow chart that are dependent on whether or not the target address is in the secure domain or not are the same apart from the fact that if the target address is not secure we push some registers and use the clear multiple instruction. Thus, in an alternative embodiment the "set ASSel flag, and further flag" instruction could be used, and in this case the push of the registers and the clear multiple instruction could be performed dependant upon the value of the further flag set by this instruction.

Although illustrative embodiments have been described in detail herein with reference to the accompanying drawings, it is to be understood that the claims are not limited to those precise embodiments, and that various changes and modifications can be effected therein by one skilled in the art without departing from the scope and spirit of the appended claims. For example, various combinations of the features of the following dependent claims could be made with the features of the independent claims.

We claim:

1. A data processing apparatus comprising:
processing circuitry configured to execute a stack select flag set instruction specifying a register and, in response to said select flag set instruction, to determine whether a target address that is stored in said register is in a less secure region of a data store than a current operating region, and when said target address is determined to be in said less secure region to set a stack select flag to indicate said less secure region;
wherein in response to program code calling a function stored in a first region of the data store, the processing circuitry is configured to access a first stack stored in the first region for function arguments and return data values when said stack select flag indicates the first region, and to access a second stack stored in a second region of the data store for the function arguments and the return data values when said stack select flag indicates the second region.

2. The data processing apparatus according to claim 1, wherein said processing circuitry is configured to set the stack select flag to indicate the current operating region when said target address is determined to be in said current operating region.

3. The data processing apparatus according to claim 1, wherein the processing circuitry is configured to determine which of a plurality of stacks stored in the data store to use for accessing function arguments and function return data values in dependence on the stack select flag.

4. The data processing apparatus according to claim 1, comprising a first stack pointer register to store an address of a first stack stored in the data store, and a second stack pointer register to store an address of a second stack stored in the data store;
wherein the processing circuitry is configured to determine which of the first stack pointer register and the second stack pointer register to access in dependence on the stack select flag.

5. The data processing apparatus according to claim 1, wherein the processing circuitry is configured to operate in a first domain when processing program code stored in said first region of the data store and configured to operate in a second domain when processing program code stored in said second region of the data store, wherein at least some data accessible to said data processing circuitry when operating in said first domain is inaccessible when operating in said second domain.

6. The data processing apparatus according to claim 5, wherein said data processing circuitry is configured to determine whether to operate in said first domain or said second domain based on whether the program code to be processed is stored in said first region or said second region.

7. The data processing apparatus according to claim 1, wherein the stack select instruction comprises a further flag set instruction, and when said target address is determined to be in said less secure region, the processing circuitry is configured to also set a further flag.

8. The data processing apparatus according to claim 7, wherein the processing circuitry is configured to execute at least one conditional instruction in dependence on said further flag.

9. The data processing apparatus according to claim 1, wherein said processing circuitry is configured, in response to a register stack load instruction in said program code indicating at least one register is to be loaded with a value from at least one location on a stack, to determine which stack to access in dependence upon said stack select flag.

10. The data processing apparatus according to claim 1, wherein said processing circuitry is configured, in response to a register stack store instruction in said program code indicating at least one value stored in at least one register is to be stored in at least one location on a stack, to determine which stack to access in dependence upon said stack select flag.

11. A data processing method comprising:
- executing a stack select flag set instruction specifying a register;
- in response to said select flag set instruction, determining whether a target address that is stored in said register is in a less secure region of a data store than a current operating region; and
- when said target address is determined to be in said less secure region, setting a stack select flag to indicate said less secure region;
- wherein in response to program code calling a function stored in a first region of the data store, accessing a first stack stored in the first region for function arguments and return data values when said stack select flag indicates the first region, and accessing a second stack stored in a second region of the data store for the function arguments and the return data values when said stack select flag indicates the second region.

* * * * *